July 9, 1957 — H. R. SUMMERHAYES, JR — 2,798,966
SURFACE INSPECTION EQUIPMENT
Filed Nov. 23, 1955 — 2 Sheets-Sheet 1
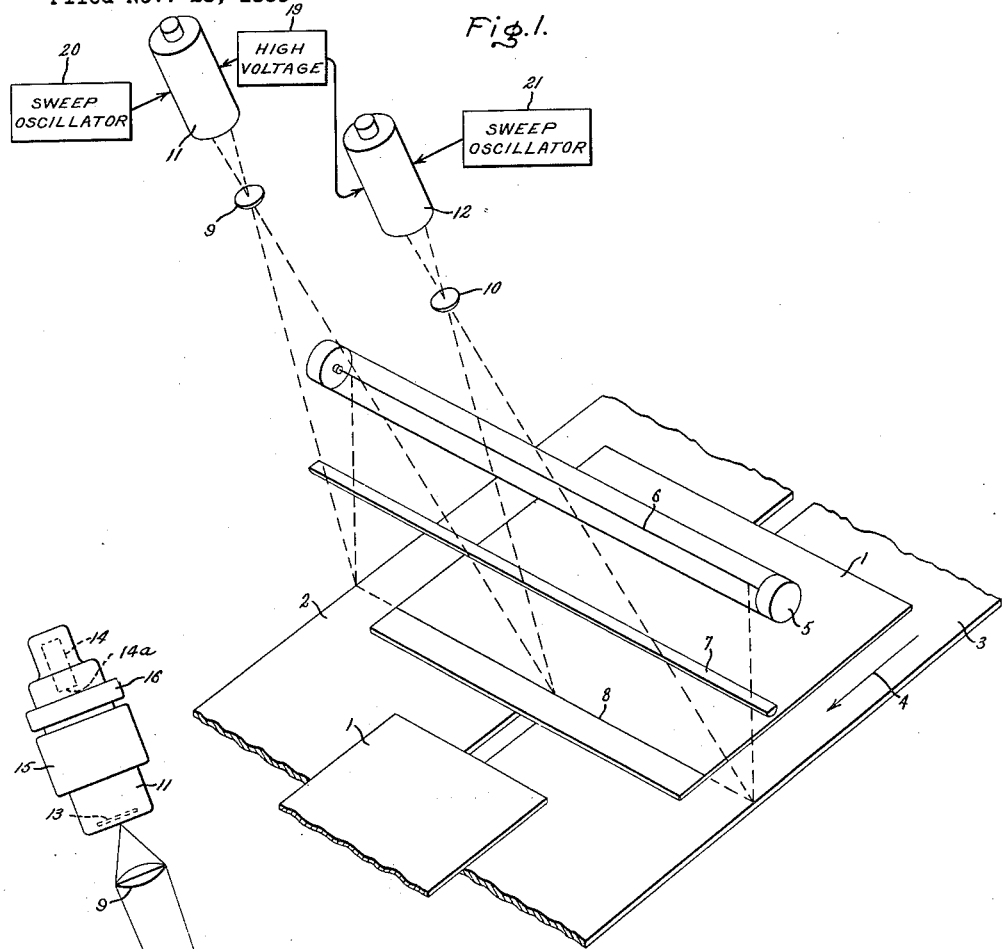
Fig.1.
Fig.2.
Fig.3.
A —— IMAGE ON ELECTRON CAMERA CATHODE OF ILLUMINATED LINE ON INSPECTED SURFACES
B —— SCANNING PATH CURVATURE
C —— SCANNING PATH / APERTURE SHAPE / FILAMENT IMAGE
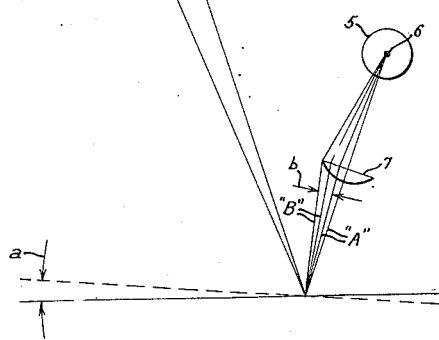
Inventor:
Harry R. Summerhayes, Jr.,
by Irving B. Marshman
His Attorney.

July 9, 1957 H. R. SUMMERHAYES, JR 2,798,966
SURFACE INSPECTION EQUIPMENT
Filed Nov. 23, 1955 2 Sheets-Sheet 2
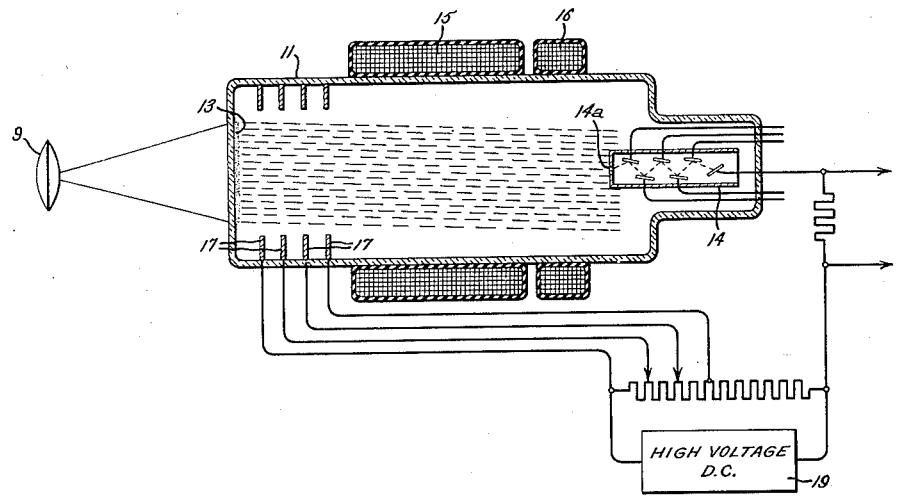
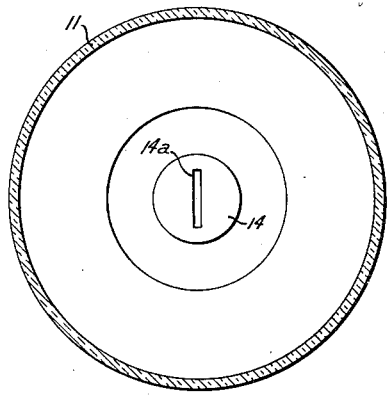
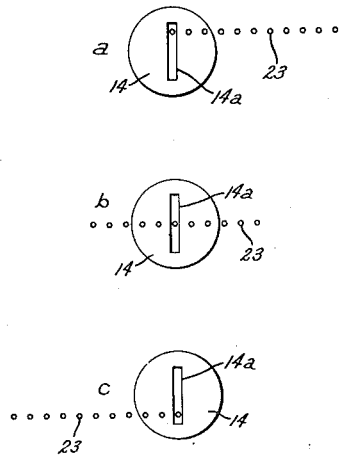
Inventor:
Harry R. Summerhayes, Jr.,
by Irving H. Marshman.
His Attorney.

United States Patent Office 2,798,966
Patented July 9, 1957

2,798,966
SURFACE INSPECTION EQUIPMENT

Harry R. Summerhayes, Jr., Schenectady, N. Y., assignor to General Electric Company, a corporation of New York Application November 23, 1955, Serial No. 548,572

4 Claims. (Cl. 250—219)

This invention relates to inspection equipment for flat material such as tinplate having a reflective surface. More particularly, the invention relates to inspection equipment utilizing an electron-optical device such as an electron camera tube to view the surface of the material undergoing inspection and to develop an electric output signal indicating the existence of one or more flaws or imperfections in the surface. Still more specifically, the invention relates to inspection equipment of the character described in the foregoing in which the electron camera effects a point by point scanning inspection of the surface of the material at a relatively rapid rate and is capable of detecting any abrupt change in its reflective qualities such as would be produced by a scratch, blemish or other reduced reflectivity condition.

In a known inspection equipment of the character described in the foregoing, an area of the surface of the reflective material under inspection was illuminated by a light source which was made relatively broad to counteract the effect of deviation from flatness of the strip and deviation in the rectilinearity of the scanning path of the electron camera. From a practical point of view, this illuminating and optical system left much to be desired and accordingly, an object of this invention is the provision in a surface inspection equipment of an improved illuminating and optical system for use with the electron camera of a surface inspection equipment such for as example as claimed in application Serial No. 475,760 Richard E. Milford filed December 16, 1954 and assigned to the same assignee.

In carrying the invention into effect in one form thereof, a relatively narrow line filament lamp is provided as a source of illumination together with a cylindrical lens for imaging the lamp filament as a bright line on the surface of the material undergoing inspection. An objective lens images this bright line on the photo cathode of an electron camera tube. Curvature in the sweep of the scanning path is taken care of by the provision of an oblong rectangular scanning aperture at the entrance to the electron collector of the camera and a specified degree of tilting of the sheet under inspection is taken care of by making the angle subtended by the condensing lens as seen from the surface of the sheet larger than the angle subtended by the objective lens as seen from the surface of the sheet.

For a better and more complete understanding of the invention, reference should now be had to the following specification and to the accompanying drawings of which Fig. 1 is a simple, diagrammatical view in perspective of an embodiment of the invention. Figs. 2 and 3 are diagrammatical sketches which facilitate an understanding of the invention and its operation, Fig. 4 is an enlarged sectional view of an electron camera of the image dissector type which is used in an embodiment of the invention, Fig. 5 is a diagrammatic sketch which illustrates the aperture in the electron multiplier and Fig. 6 is a diagrammatic sketch which facilitates an understanding of the operation of the invention.

Referring now to the drawing, the inspection equipment is designed to view flat material which may be in the form of individual sheets or a continuous length of a material which has a reflective surface, such for example as tinplate. In the drawing, the equipment is illustrated as applied to the inspection of a succession of individual sheets 1. These sheets are disposed upon a split conveyor belt having two sections 2 and 3 which advance the sheets in the direction of the arrow 4.

Positioned above the conveyor belt is a lamp 5 which serves as a light source for illumination of the sheet undergoing inspection. It has a long, linear filament 6 unsupported except at the ends. Preferably, it is made of tungsten and has a circular cross-section of relatively small diameter, e. g. .030". The length of the lamp is determined by the width of the conveyor belt which in turn is determined by the width of the sheets under inspection. In one practical embodiment of the invention, the length of the lamp is 47". In general, this length is adequate for commercial tinplate and many other sheet or continuous strip materials. It could, of course, be made longer or shorter for use in inspection equipment for sheets having greater or lesser widths respectively. The lamp is supported in a housing member, not shown, a suitable distance above the conveyor belt and with its longitudinal dimension disposed perpendicular to the direction of travel of the sheet material. No reflector is needed.

Between the lamp and the conveyor is mounted a cylindrical lens 7 with the axis of its long dimension substantially perpendicular to the direction of travel of the conveyor and parallel both to the filament 6 and to the plane of the sheet material under inspection. As seen most clearly in Fig. 2, the lens is not positioned directly beneath the lamp but is displaced from the vertical plane of the lamp filament in the direction of travel of the conveyor so that a light ray in a vertical plane parallel to the direction of travel and passing through the optical center of the lens makes an angle with the perpendicular at its point of incidence with the surface of the material under inspection.

The cylindrical lens 7 forms an image of the filament 6 as a brightly illuminated line 8 on the surface of the sheet 1, and specularly reflected light in the form of a wedge-shaped beam of light rays is reflected from the surface and directed through objective lenses 9 and 10 into a pair of electron cameras 11 and 12 which preferably are of the image dissector type. As shown in Figs. 2 and 4, the camera tube 11 has a photo-cathode surface 13, an electron-collector 14, a deflection coil 15, a focussing coil 16 and accelerating electrodes 17. Such focussing coils and accelerating electrodes are used in camera tubes to form an electron image of the photo-cathode on the plane of the aperture 14a on the front end of the multiplier. The aperture 14a as viewed from the photo-cathode end of the tube is illustrated diagrammatically in Fig. 5. As shown, the aperture has an oblong rectangular shape of which the long dimension is perpendicular to the direction of the sweep path. The length of the long dimension is greater than the maximum perpendicular distance between the arc of the curved sweep path and the chord which joins its ends. In a practical embodiment of the invention which gave satisfactory performance, the short dimension of the aperture was .0075 inch and the long dimension was .15 inch. The camera 12 has a similar construction.

As shown, the light from one-half of the illuminated line image of the filament is directed into one of the cameras and the light from the other half is directed into the other camera.

On the photo-cathode surface 13 of the electron camera 11, an image of one-half or more of the bright line 8 is formed by the wide angle objective lens 9. A similar image of the other half or more of the line 8 is formed on the photo-cathode surface of the other electron camera 12 by the similar wide angle objective lens 10. Thus, there appears on the photo-cathode of each electron camera an image of at least one-half of the brightly illuminated line 8 on the surface under inspection. Some overlapping of the image regions is desirable to ensure complete coverage of the material scanned. This image on the photo-cathode is represented in Fig. 3a by the line 18.

It is desired to inspect the surface of the sheet 1 with a point-to-point scanning action so that at any one instant, only a small element of the surface is examined for specular reflectivity thus making the system sensitive to detection of small spots on the surface of the material undergoing inspection. The scanning action required for inspection of the whole surface is accomplished by moving the material surface under the scanner in a direction perpendicular to the illuminated line 8 and at the same time electronically scanning the image 18 of the line 8 repeatedly along the direction of the line. The electronic scanning rate is chosen to be rapid enough relative to the velocity of the material surface to ensure that the material moves less than the width of the line 8 during each electronic scan along the length of the image 18 of the line 8. In this way, complete inspection coverage of the surface is assured.

The electron camera tubes 11 and 12 shown in Fig. 2 are of a type commonly known as image dissectors, and the electronic scanning is accomplished as follows in these tubes. The line image 18 on the photo-cathode 11 of the camera tube 9 produces an axially flowing sheet of electrons whose intensity at any point in the cross-section is proportional to the brightness of the light on the photo-cathode surface at the corresponding point of the illuminated line image. These electrons proceed from the photo-cathode at the front end of the electron camera to the electron collector at the opposite end. A high voltage supply 19 provides D.-C. voltages to accelerate these electrons from the photo-cathode surface at the front of the tube to the collector aperture at the rear. The focusing coil produces a constant axial magnetic field which serves to form a sharp electron image of the line 18 in the plane of the collector aperture. The collector aperture allows a portion of the electron image to enter a series of conventional photomultiplier stages to intensify the electron current. The output of the photomultiplier generates a signal voltage in the output circuits of the camera tube which is used to determine the changes in reflectivity as the scanning action proceeds. Scanning of the bright line image on the photo-cathode is accomplished by means of the horizontal deflection coils which are supplied from the sweep oscillators 20 and 21. These coils produce a varying transverse magnetic field which deflects the electron image back and forth across the collector aperture and thus produces the desired scanning action.

Owing to certain deficiencies in the geometry of the deflection system of an image dissector-type electron camera, the scanning path is not perfectly rectilinear but has a certain amount of curvature as indicated by the bow-shaped curve 22 in Fig. 3b. However, the use of an oblong rectangular-shaped collector aperture having its long dimension perpendicular to the illuminated line image on the photo-cathode assures coincidence between such straight line image and the imperfect curvilinear scanning path, i. e. it assures that the electron image of the line on the photo-cathode which is focussed in the plane of the aperture will intersect the aperture at all times during a complete scan. This is illustrated in the drawing in Fig. 6 in which the electron image of the line which is focussed in the plane of the aperture is represented by a series of small circles 23. At one end of a scan, which may be assumed to be the beginning of a left to right scan, the electron image 23 of the line occupies a position such that it intersects the aperture 14a near its upper end as illustrated in portion (a) of Fig. 6. In the middle of the scan, the electron image of the line intersects the aperture at a relatively lower point on the long dimension as shown in portion (b) of Fig. 6. At the opposite end of the scan, as illustrated in portion (c) of Fig. 6, the electron image again intersects the aperture near the upper end of its long dimension. It will be noted that the difference between the intersection points in sections (a), (b) and (c) of Fig. 6 is equal to the maximum distance between the low point in the center of the scanning path curve 22 of Fig. 3b and the high points at the ends.

In the known wide light source and round hole construction referred to in the foregoing, the width of the light source was required to be sufficient to cover (1) the full extent of the curvature of the sweep path, and (2) the tilt of the sheet being inspected in order to insure that specularly reflected light would always be collected by the objective lenses 9 and 10. This is expensive and difficult of achievement particularly when high intensity light sources are needed. In the rectangular scanning aperture structure of the present invention, the burden of correcting for the curvature of the sweep is placed upon the scanning aperture which can readily and inexpensively be made in the required shape so that it becomes possible to use a simple line filament lamp as a source of light for illuminating the area for the surface under inspection.

Reasonable deviation from flatness in the tinplate surface can be tolerated because the cylindrical lens furnishes light rays from the lamp through a wide enough angle to assure that the camera lens receives light even when the angle of the surface undergoing inspection changes within predetermined limits. This is illustrated in Fig. 2 in which the light rays emanating from the filament and passing through the cylindrical lens 7 are divided into a bundle of rays A and a bundle of rays B. The axes of these bundles diverge from each other by an angle $b$ which is equal to twice the angle of tilt $a$ which is shown as the maximum deviation from flatness of the surface under inspection which can be tolerated. Thus, if the surface is perfectly flat, the bundle of rays A enters the electron camera, and if this surface deviates from flatness by the angle $a$ or ½$b$, the bundle of rays B enters the electron camera. It is necessary to make the angle subtended by the condensing lens from the sheet larger than the angle $A=B$ by an amount such that angle $b=2a$ in order to take care of a tilt angle or deviation from flatness of plus or minus $a$ of the material.

In a practical embodiment of the invention, the long linear lamp 5, the cylindrical lens 7 and the electron cameras 11 and 12 are all mounted within a single structure or unit directly above the conveyor belt upon which the material under inspection is disposed. The split conveyor belt 2, 3 advances the sheet 1 beneath the light sensitive source and camera unit. A surface flaw such as a scratch or other imperfection which results in a condition of reduced reflectivity of the surface under inspection produces in the output circuits of one of the electron cameras a sharp signal pulse voltage which is developed into an output electric signal by means of amplifier circuits, and suitable connecting conductors and electronic channels leading to an output circuit as set forth in application Serial No. 475,760-Milford.

Although in accordance with the provisions of the patent statutes, this invention is described as embodied in concrete form and the principle has been explained together with the best mode in which it is now contemplated applying that principle, it will be understood that the apparatus shown and described is merely illustrative and that the invention is not limited thereto since alterations and modifications will readily suggest themselves to persons skilled in the art without departing from the true spirit of the invention or from the scope of the annexed claims.

What I claim as new and desire to secure by Letters Patent of the United States is:

1. In an electron optic surface flaw inspection equipment for flat material having a reflective surface, the combination with an electron optics means of the image dissector type having a photo-cathode, an electron collector having a rectangular shaped aperture therein and electron deflecting means, of an optical system comprising a long narrow-line light filament, a cylindrical lens disposed to image said filament as an illuminated line on the surface of the material undergoing inspection, and an objective lens for imaging said illuminated line on the photo-cathode of said electron optics means.

2. In an electron optic surface flaw detector and inspection equipment for flat material having a reflective surface, the combination comprising an electron camera tube of the image dissector type having a photo-cathode, an electron collector and electron deflecting means and having a curved scanning path, an optical system comprising a lamp having a long relatively narrow light filament of circular cross-section, a cylindrical lens disposed to image said filament as an illuminated line on the surface of the material undergoing inspection, an objective lens for imaging said illuminated line on said photo-cathode, and said electron collector having an oblong rectangular shaped aperture having its longer dimension greater than the maximum distance between said curved scanning path and a chord joining its ends and disposed perpendicular to said line image on said photo-cathode.

3. In an electron optic surface flaw detector and inspection equipment for flat material having a reflective surface, the combination with an electron camera tube of the image dissector type having a photo-cathode, an electron collector and electron deflecting means and having a curved scanning path of an optical system comprising a lamp having a long relatively narrow light filament of circular cross-section, a cylindrical lens disposed to image said filament as an illuminated line on the surface of the material undergoing inspection, an objective lens for imaging said illuminated line on said photo-cathode, said cylindrical lens subtending a greater angle as viewed from the surface undergoing inspection than the angle subtended by said objective lens as viewed from said surface and said electron collector having an oblong rectangular shaped aperture having its longer dimension greater than the maximum distance between said curved scanning path and a chord joining its ends and disposed relatively perpendicular to the image of said line on said photo-cathode.

4. In an electron optic surface flaw inspection equipment for sheet material having a reflective surface, the combination comprising an electron optics means for viewing the surface of the material undergoing inspection having a photo-cathode, an electron collector and electron deflecting means, an optical system comprising a long narrow-line light filament, means mounting said filament in proximity to the surface of the material undergoing inspection with its axis parallel to the plane of said material and approximately perpendicular to the direction of movement thereof, a cylindrical lens disposed between said filament and the surface undergoing inspection for imaging said filament thereon as an illuminated line, an objective lens disposed to image said line on said photo-cathode, and said collector having an oblong rectangular shaped scanning aperture having its longitudinal axis substantially perpendicular to said line image on said photo-cathode.

References Cited in the file of this patent

UNITED STATES PATENTS

| | | |
|---|---|---|
| 2,459,778 | Larson | Jan. 18, 1949 |
| 2,674,917 | Summerhayes | Apr. 13, 1954 |